United States Patent
Polozola et al.

(10) Patent No.: US 8,355,492 B1
(45) Date of Patent: Jan. 15, 2013

(54) SYSTEMS AND METHODS FOR REMOTE CALL REDIRECTION DETECTION AND TREATMENT

(75) Inventors: Michelle L. Polozola, Richardson, TX (US); Stuart Rosenfield, Plano, TX (US); Randy Hoffman, Plano, TX (US)

(73) Assignee: Securus Technologies, Inc., Dallas, TX (US)

(*) Notice: Subject to any disclaimer, the term of this patent is extended or adjusted under 35 U.S.C. 154(b) by 1794 days.

(21) Appl. No.: 11/562,763

(22) Filed: Nov. 22, 2006

(51) Int. Cl.
*H04M 3/42* (2006.01)
*H04M 15/00* (2006.01)

(52) U.S. Cl. ......... 379/211.02; 379/114.15; 379/114.17; 379/114.2; 379/114.21; 379/211.01

(58) Field of Classification Search ............. 379/211.01, 379/114.2, 211.02, 212.01, 114.21, 111, 379/114.17, 114.15, 114.16
See application file for complete search history.

(56) References Cited

U.S. PATENT DOCUMENTS

2002/0168060 A1* 11/2002 Huie .................. 379/211.02
2005/0195951 A1   9/2005 Bunker
2005/0265529 A1* 12/2005 Hogg et al. ............. 379/114.2

OTHER PUBLICATIONS

U.S. Appl. No. 10/135,878, filed Apr. 29, 2002, Viola et al.
U.S. Appl. No. 10/135,883, filed Apr. 13, 2010, Falcone et al.
U.S. Appl. No. 10/646,638, filed May 13, 2008, Kurth et al.
U.S. Appl. No. 10/217,149, filed Apr. 10, 2007, Mudd et al.
U.S. Appl. No. 10/642,532, filed May 12, 2011, Robert L. Rae.

* cited by examiner

*Primary Examiner* — Thjuan K Addy
(74) *Attorney, Agent, or Firm* — Fogarty, L.L.C.

(57) ABSTRACT

Systems and methods in which call intelligence, such as may be deployed in communication with signaling systems utilized in controlling calls and telecommunication databases, is used to analyze information about a call in order to make a determination as to the likelihood or risk that call redirecting, such as call forwarding or remote call forwarding, will be invoked with respect to a call are shown. The call intelligence, upon a determination that an unacceptable risk that call redirecting will be invoked, preferably institutes appropriate call treatment or handling procedures, such as to block the call or to allow the call while invoking additional call treatment action.

42 Claims, 4 Drawing Sheets

SYSTEMS AND METHODS FOR REMOTE CALL REDIRECTION DETECTION AND TREATMENT

CROSS-REFERENCE TO RELATED APPLICATIONS

The present invention is related to co-pending and commonly assigned U.S. patent application Ser. No. 10/217,149 entitled "System and Method for Call Treatment," filed Aug. 12, 2002, Ser. No. 10/646,638 entitled "System and Method for Call Redirect Detection and Treatment," filed on Aug. 22, 2003, Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, and Ser. No. 10/642,532 entitled "Centralized Call Processing," filed Aug. 15, 2003, the disclosures of each of which are hereby incorporated herein by reference in their entirety.

TECHNICAL FIELD

The present invention relates generally to telecommunications, and more particularly to detecting call redirecting.

BACKGROUND OF THE INVENTION

Since the divestiture of North America's telecommunication market, there has been an increase in the number of participants throughout the various fields of the industry: both facilities and non-facilities based. Additional competitors, e.g., competitive local exchange carriers (CLECs) have joined incumbent local exchange carriers (ILECs), local service providers (LSPs), line resellers, service providers, etc., in the telephony market.

The competition among competitors is carried out over the public switched telephone network (PSTN). The PSTN is the means through which the various competitor's systems work together to connect a call originating with one provider's network and terminating with another provider's network. Among the basic building blocks of the PSTN are the switching, signaling, and intelligent network service systems. The switching systems are spread throughout the world primarily as central (local) office switches or service switching points (SSP). These switches connect the line of one party to another party's line or to an outgoing interoffice transmission facility. In addition to switching calls, SSPs also provide usage measurements of calls for billing purposes. Interoffice transmission facilities consist of the physical medium (typically fiber optics or wireless) to connect switching systems.

The signaling system provides the signaling capabilities to establish a call between switching systems. The most common type of signaling used in the PSTN in the United States is referred to as Common Channel Signaling System Number 7 (CCS/SS7 or simply SS7). A telecommunications network that uses SS7 signaling sends signaling messages or packets over a packet network to exchange call control and service information among network elements. SS7 is a key element in supporting a large number of applications in telecommunications networks ranging from call control or basic call setup, to intelligent network services and efficient interconnection of networks for the various competitors in the market.

A segment of the competitive marketplace has developed around providing telecommunication services to certain facilities where a caller has limited options for services, such as local and long distance calling services, or where access to the telecommunication network is controlled. These telecommunication companies include companies that provide services to dormitories, hotels, hospitals, and detention facilities, such as jails or prisons.

As an example, detention facilities generally require various levels of security over the calls made by inmates. Typically, the detention facility would contract with a service provider (DFSP), which is capable of providing the specialized telecommunication services that detention facilities might need, for a communications system that allows the inmate to interface with the PSTN, while maintaining an appropriate level of security over the call. Because of the increased level of security over the calls, these service providers typically charge an inmate higher rates for long distance and local connections over the PSTN than would normally be charged by other carriers in the competitive marketplace.

In order to establish service at a detention facility, the DFSP would interpose its network and/or call processing system between the PSTN and an inmate in the detention facility. The DFSP would typically provide its phone equipment and call processing for an inmate's calls through a network that interfaces over a high capacity line, such as a T1 line, with the PSTN. Once on the PSTN, the calls are ultimately terminated at the desired telephone number through the use of another service provider's lines and equipment, which is set up and connected by the use of the intelligent network elements described hereinabove. Thus, the inmate would be granted access to other calling companies networks through the DFSP network and call processing system.

This system may include various features aimed at providing specialized services that may be desirable in a detention facility. These services may include call treatment measures such as increased security over the calls, caller identification, controlled access between the PSTN network and the detention facility telecommunications network, recording the inmate's phone conversations, maintaining a database of all calls to and from the facility/inmates, notifying the appropriate authorities about a call in a timely manner, and account verification for call payment information. This listing of services is not meant to be exhaustive of all services that may be provided or requested.

After initiation of a phone call either by or to an inmate, an interaction begins with a call processing system of the DFSP, wherein the appropriate call treatment measures are determined. It should be understood that various levels of security and call treatment measures may be invoked for different inmates and different facilities. As an example, the process may start with an inmate accessing the DFSP network by trying to place a call at one of the telephone terminals located at various locations in the detention facility and designated for use by the inmates to make telephone calls. The call may begin with the inmate identifying him/herself through the use of a personal identification number, password, or some other means of identification whereby the DFSP can verify the identify of the inmate for use in further call verification procedure.

A call verification procedure that might occur after the inmate enters the PIN number is a determination concerning the method of payment for the call. Some of the methods for paying for the call include a prepaid account credited with a certain amount of money against which the call charges will be debited, alternative call billing (e.g., reversing the call charges (a collect call) or billing the call to a third party), or the use of a detention facility account (e.g., the detention facility may have authorized payment for the call, such as a call to the prisoner's lawyer). If the call is an alternatively billed call, then call processing may make a determination about the probability that appropriate funds may be collected from a responsible party (e.g., the called party or a third party).

A collect call is a service provided to telephone customers, wherein another party, e.g., called party, is billed for the call as opposed to the calling party or originating line number as are routinely billed. Upon receiving a request for a collect call, the telephone company ultimately responsible for billing the calling party (e.g., calling party billing entity), will attempt to identify the billing entity ultimately responsible for billing the called party (e.g., called party billing entity). This information is often obtainable through a line information database (LIDB), and the information can be obtained either directly, or indirectly, from fields such as operating company numbers (OCNs), account owner (AO), originating line number screening (OLNS), line providers, alternative billing services, number portability, calling features, etcetera.

If the identity of the called party's billing entity is unobtainable, the calling party's billing entity may be reluctant to connect the call between the parties, because of the risk involved with connecting a collect call to a called party having an unidentified billing entity. This may result in a calling party's billing entity choosing not to complete the connection for the call and thus, forgo potential revenues. The loss of revenue may be due to the inability to accurately bill for services provided, or the perception that the called party to be billed is not a credit worthy consumer.

The financial risk associated with a collect call may be overcome by having the inmate establish a prepaid account. Likewise, prepaid accounts may be established to facilitate calls where a called party's billing entity cannot be billed (e.g., does not have a billing agreement with the calling party's billing entity, does not support collect calls, etc.). It is often in the best interest of an inmate wishing to insure that his/her calls are not blocked because of collection risk or other factors to establish a prepaid account, wherein a certain amount of money is deposited in an account for the benefit of the inmate to pay for the charges incurred during a telephone call. Typically, the inmate, or a friend, or a family member would set up and fund a prepaid account with the DFSP, thus avoiding the problems associated with collection risk, and providing a method of call payment that can be easily verified by the call processing system.

Information about whether an inmate has a prepaid account may be stored in a database, such as may be created and/or maintained by the DFSP. Such a database may also contain other information about the inmate, such as other account information, the level of security that should be maintained over the call, a list of numbers the inmate has been authorized to call, a list of numbers the inmate is not allowed to call (such a the judge, or victim), whether the call should be recorded, and whether a person at the detention facility or at a governmental agency should be notified about the call. Thus, depending on the level of security that is to be maintained over the call and the particular type of facility and/or inmate, these and other security and/or call treatment measures may be invoked. Similar database entries may be used with respect to inmates which do not have a prepaid account (e.g., inmates calling numbers for which collect calling LEC billing is available).

One of the security measures that may be invoked during call processing would be cross referencing the number dialed by the inmate against a list of numbers that the inmate is prohibited from calling. This list may include the numbers of persons such as the judge, or the crime victim. Prison administrators are often interested in knowing the termination point for inmate calls, such as to prevent calls to certain individuals (e.g., gang members), certain areas (e.g., high crime areas), certain facilities (e.g., other prison facilities), etc. Moreover, the identity of the called party, such as may be obtained through the aforementioned BTN, is often of interest to investigators. Accordingly, if the inmate attempts to call an unauthorized number or otherwise attempts a call posing a security risk, the call may be blocked before a connection is established and/or the call can be reported to prison authorities. If a call is allowed to proceed, a decision may also be made to record the call, so that the contents of the call can be reported to the appropriate authorities. As can be seen from the above description, it is often important to know both the number dialed and the actual termination point of the call in order to prevent the inmate from circumventing the security measures.

As a result of these added security measures, the DFSP have higher operating costs, which are recouped to some extent through higher calling charges than would ordinarily be charged in the competitive marketplace. Unfortunately, enhanced calling services have been misused by certain businesses and individuals in an attempt to profit by arbitraging the higher rates charged by the DFSP. In order to arbitrage the higher rates, an arbitrage business might obtain, from a LEC or other competitor, a phone number in the LEC's network that is local or intralata to the prison facility. The arbitrage business may then establish a remote call forwarding (RCF) service at that phone number to forward calls to a different termination point. Accordingly, the call may appear to the DFSP to be a local call, charged at a rate lower than a long distance call, when in fact the call terminates at a location which would result in a long distance rate by the DFSP. However, because the arbitrage business is not providing the security services of the DFSP, the arbitrage business provides this long distance link at closer to market rates than does the DFSP.

An inmate, or a friend or family member of the inmate, who desires to avoid the higher long distance rates charged by the DFSP, could then use the local number where a RCF platform has been established to provide the RCF service. This call would be charged by the DFSP at a rate for local call, and received by the RCF platform, which would then forward the call to the desired number. By charging a rate for the call that is lower than the rate that charged by the DFSP for a long distance call, the business operating the RCF service could thus profit at the expense of the DFSP, while the inmate saves an amount equal to the difference between the higher and lower rate. However, since the true termination point of the call is different from the called number, the DFSP not only loses revenue, but also loses visibility over the true destination where the telephone call is terminated and thus security may be compromised.

Usually the destination phone number that the inmate is trying to reach would belong to a person, such as a family member or a friend of the inmate, who lives at a location where a call would be charged at a long distance rate by the DFSP. When a RCF business establishes a local telephone number at a location, they typically provide their own Billing Name and Address (BNA) to the Local Exchange Carrier (LEC). Then, they place a RCF platform that provides the RCF services at that location.

The RCF platforms often operate through the use of a Direct Inward Dialing (DID) circuit. A call received at the DID circuit is preceded by a packet of information that contains the number dialed. The remote call forwarding platform receives the call and looks up the corresponding long distance number and then forwards the call to that number. Thus, when the prisoner calls the assigned local number, the platform receives the call and automatically forwards the call to the telephone number of the family member or friend programmed as the final destination number for that call.

As previously discussed this arbitrage activity causes several problems for the DFSP and the prison facility. Primarily the call forwarding activity diminishes the level of security over the call by terminating the call at a location remote from the called number, causing the service provider to lose visibility of the final termination point of the call. Thus, the service provider is unable to collect accurate information regarding the call activity in order to block the call, report the call to the prison facility, etc. Another consideration for the service provider is the revenue lost to these call forwarding businesses.

BRIEF SUMMARY OF THE INVENTION

The present invention is directed to systems and methods in which call intelligence is used to detect remote call redirection. Embodiments of the invention analyze various information to detect remote call redirection is likely to be or is being implemented with respect a call and preferably provide call treatment determinations with respect to the call, such as to release the call, not to complete the call, to place a customer service representative on the call, to provide an alert to appropriate personnel, to lower a payment verification point (PVP) or post-payment value amount, and/or the like. Information analyzed according to embodiments of the invention may include whether the call being placed is local exchange carrier (LEC) billed, whether the call being placed is prepaid, whether the billing name and address (BNA) or similar information matches the geographic location of a location associated with the called number, whether the BNA or similar information is associated with a physical address or a mail drop (e.g., post office box), and whether the BNA or similar information is similar to that of other parties called from the facility. Embodiments of the invention may operate to conclude that a risk of remote call redirection is present with respect to a particular call based on one or more of the above criteria having been met. Appropriate call treatment action is preferably taken, such as to select a particular call treatment based on the number and/or particular criteria met.

Embodiments of the present invention may provide for use of SS7 and AIN networks in detecting remote call redirection and/or to affect the treatment of calls. Call intelligence of the present invention may be coupled to or disposed within such networks to receive signaling therefrom and/or transmit signaling thereto for determining the appropriate treatment of a call and, preferably, controlling the treatment of a call in accordance with such determination. According to a preferred embodiment, call intelligence of the present invention is disposed at a position or positions such that a positive or negative decision may be made with respect to a call very rapidly. Embodiments of the invention contemplate the use of information obtained from an intelligent network, such as the SS7 and AIN networks, to make determinations with respect to remote call redirection and/or treatment of a call before completion thereof. For example, embodiments of the present invention may query intelligent network systems and/or systems coupled thereto, such as the aforementioned SSPs, STPs, SCPs and/or telecommunication databases such as LIDB, in order to collect information for use in remote call redirection and/or call treatment determinations. Such information may be collected whether a calling connection is setup or not, and is preferably stored for later use, such as for statistical or trend analysis and/or for use in subsequent call connection determinations.

Calls for which treatment determinations are provided according to embodiments of the present invention may be calls originating from a particular location (e.g., a particular home or business), facility (e.g., a prison/jail facility), or number (e.g., a particular landline telephone number or wireless telephone number). Additionally or alternatively, calls for which treatment determinations are provided according to the present invention may be calls having a particular signaling characteristic and/or attribute associated therewith. In preferred embodiments, 1010XXX (dial around calls by a casual customer may be routed to call intelligence of the present invention as part of call setup or treatment.

For the purposes herein, "treatment" with respect to a call means any decision that would be applied to a call attempt or applied to an aspect of a call. Such treatment of a call as provided herein is preferably the a result of obtaining information associated with the call and/or information contained in databases of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
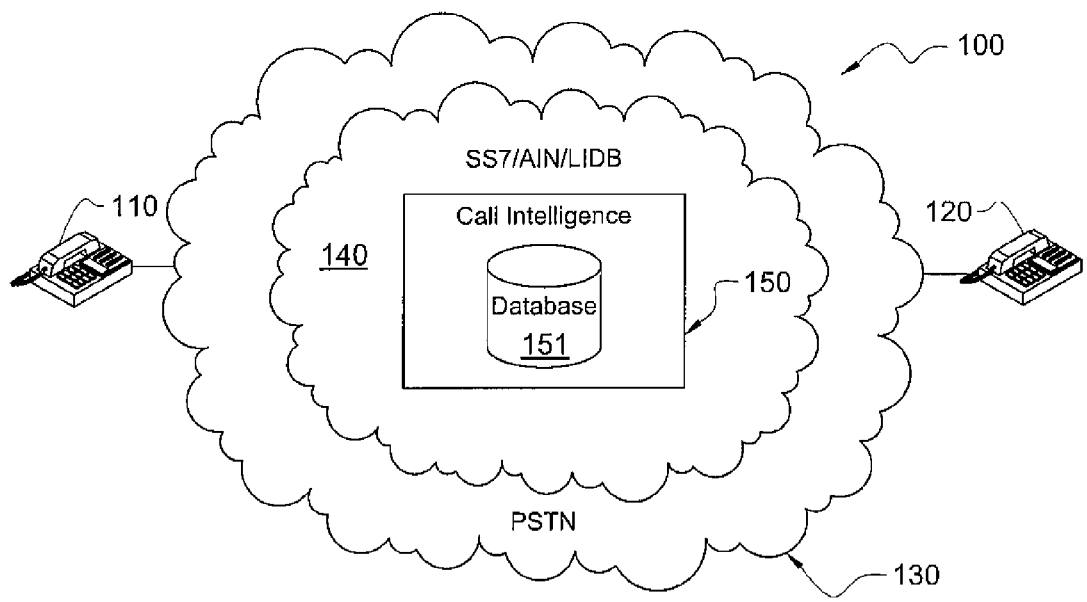
FIG. 1 shows a communication system adapted according to an embodiment of the present invention.

FIG. 1 shows communication system 100 adapted according to an embodiment of the invention. System 100 of FIG. 1 includes terminals 110 and 120 coupled by communication network 130 for providing information communication therebetween. Communication network 130 of the illustrated embodiment comprises the public switched telephone network (PSTN), although embodiments of the present invention may be utilized with alternative or additional communication networks (e.g., the Internet, an intranet, a local area network (LAN), a metropolitan area network (MAN), a wide area network (WAN), a wireless network, a cable transmission system, a satellite transmission system, and/or the like). Communication network 130 of the illustrated embodiment comprises signaling network 140 therein for providing out of band signaling. Signaling network 140 of the illustrated embodiment comprises an AIN, such as using a SS7 network, although embodiments of the present invention may be utilized with alternative or additional signaling networks. It should be appreciated that signaling network 140 may be provided external to communication network 130 or integral thereto, as desired.

In the examples described herein, terminal 110 may be referred to as an originating terminal (e.g., calling party terminal) and terminal 120 may be referred to as a destination terminal (e.g., called party terminal). However, it should be appreciated that either or both such terminals may be utilized in placing an/or receiving calls. Moreover, it should be appreciated that there is no limitation to the use of the two terminals illustrated and, accordingly, any number of terminals may be included with respect to system 100. Similarly, the configuration of the terminals is not limited to that illustrated and, accordingly, the terminals may comprise telephone systems (whether wireline or wireless), computer systems, facsimile systems, pagers, personal digital assistants (PDAs), and/or the like.

Although shown coupled directly to communication network 130, it should be appreciated that one or more of terminals 110 and 120 may be indirectly coupled to a communication and/or signaling network. For example, systems such as a private branch exchange (PBX), call processor, and/or the like may be disposed between a terminal and communication network. Likewise, networks, such as a LAN, a MAN, a WAN, an intranet, the Intranet, a cable transmission system, a satellite transmission system, and/or the like, may be disposed between a terminal and communication network adapted according to the present invention.

Call intelligence 150 of the present invention is preferably disposed to obtain information with respect to a call placed between terminals 110 and 120. For example, call intelligence 150 may be coupled to signaling network 140 to receive information therefrom and/or to provide information thereto. Similarly, call intelligence of the present invention may be linked to other informational databases that are part of the network (e.g. a LIDB in the AIN) for obtaining information used in detecting call redirecting, determining call treatment, and/or populating/updating information in database 151.

It should be appreciated that call intelligence 150 may be disposed centrally, such as for use with a plurality of calling party locations (e.g., a plurality of facilities for which calling services are provided), locally, such as for use with an associated calling party location (e.g., a particular facility for which calling services are provided), or combinations thereof (e.g., a distributed configuration). Moreover, it should be appreciated that additional functionality may be implemented in combination with or in association with call intelligence 150, whether at a same location therewith or coupled thereto. For example, call validation functionality, such as may provide verification of a calling/called party's identity, account verification, called and/or calling number verification, etcetera, may be implemented in combination with call intelligence 150. Additionally or alternatively, functionality such as billing, investigation, customer care, etcetera, may be provided in combination with call intelligence as described herein. Call processing systems, providing such functionality and as may be adapted to provide call intelligence according to embodiments of the invention, are shown and described in the above referenced patent application entitled "Information Management and Movement System and Method."

The illustrated embodiment of call intelligence 150 comprises database 151. Preferably, database 151 stores information useful in "scoring" call attempts and/or other aspects of a call, such as implementation of particular calling services (e.g., call redirecting and three-way calling), by call intelligence 150. Such scoring may be based upon active intelligence and/or organic information. Accordingly, database 151 may comprise information such as operating company numbers, account owner and address, originating line number screening, dialed number information, call detail records, line providers, alternative billing services, number portability, calling features, call history, law enforcement information, and/or the like.

Database 151 may additionally or alternatively include a participation matrix useful in scoring of calls by call intelligence 150. Negative and/or affirmative call treatment indicators and/or other scoring metrics may be correlated to data of particular variables which may be queried from the signaling network or as may be otherwise available for use according to the present invention. Actual treatment of a particular call may be a function of participation matrix information. For example, calls from and/or to a particular individual, facility, area, etcetera may be treated differently than calls from and/or to other individuals, facilities, areas, etcetera.

It should be appreciated that, although illustrated in FIG. 1 as being within call intelligence 150, database 151 or portions thereof may be disposed in any configuration, whether at a same location as call intelligence 150 or remote therefrom. For example, various components of the above described information stored by database 151 may be stored locally to call processors disposed at facilities for which calling services are provided which are in communication with call intelligence 150 for call treatment determinations.

Scoring of calls by call intelligence 150 may be relative to the risk of an unauthorized enhanced calling service (e.g., remote call forwarding) being implemented, relative to risk of collection of payment with respect to the call, etc. Accordingly, call intelligence 150 may provide positive and negative information and/or control signals with respect to setting up a call, continuing a call, etcetera in real time to systems of networks 130 and/or 140. Additionally or alternatively, call intelligence 150 may provide information, whether positive or negative for use with respect to future calls.

In the illustrated embodiment call intelligence 150 is disposed within signaling network 140. For example, where signaling network 140 comprises a SS7 AIN, call intelligence 150 may be coupled to or operable upon a SCP. A SCP may provide an address, such as an internet protocol (IP) address, for directing queries to call intelligence 150 of the present invention from SSPs, STPs, SCPs, and/or other devices of signaling network 140 operating to control various aspects of a call between terminals 110 and 120. Accordingly, a SCP may provide a gateway between call intelligence 150 and networks 130 and/or 140.

Call intelligence 150 may be implemented, for example, as an instruction set and associated data, e.g., database 151, operable upon a processor-based platform of a SS7 gateway, a SS7 STP, a SS7 SP, or a class 4 or 5 switch. According to embodiments of the invention, a SS7 gateway, SS7 STP, SS7 SP, or class 4 or 5 switch adapted to operate as described herein is deployed in the network to provide pre-call and/or post call analysis exclusively (i.e., providing call intelligence of the present invention without providing call connection operation as is typical of such equipment).

Figure 2:
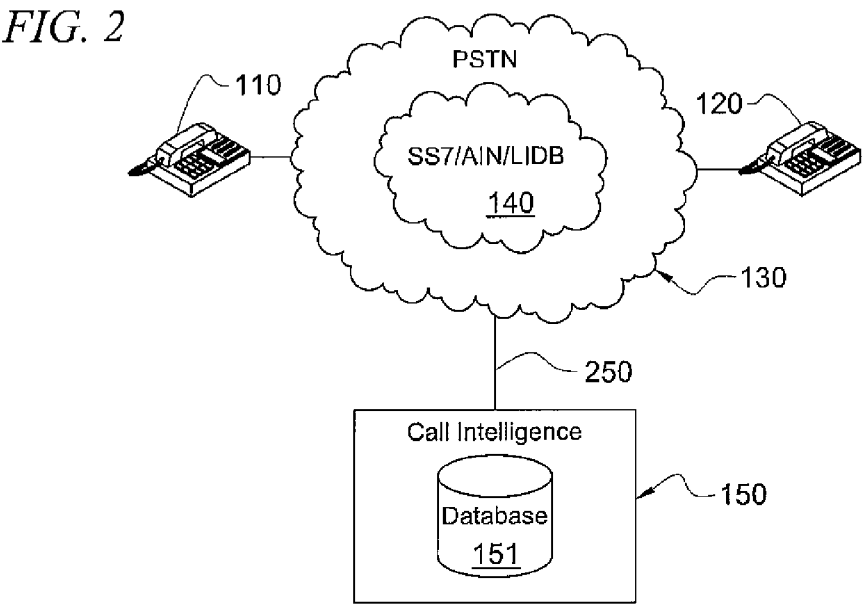
FIG. 2 shows a communication system adapted according to an alternative embodiment of the present invention.

Call intelligence 150 may, additionally or alternatively, be linked to a system of communication network 130 and/or signaling network 140, such as using a data link coupled to a SCP (not shown). One such configuration of this alternative embodiment is shown in FIG. 2 wherein call intelligence 150 is coupled to communication network 130 via link 250. Link 250 may comprise a network such as a LAN, MAN, WAN, an intranet, the Internet, a plane old telephone service (POTS) line, a trunked line (e.g., T1, OC3, etcetera), an integrated services digital network (ISDN) line, and/or the like. Call intelligence 150 of FIG. 2 may comprise a part of a centralized call processing platform, such as that shown and described in the above referenced patent application entitled "Centralized Call Processing." It should be appreciated, however, that call intelligence 150 may be disposed at any convenient location, including on the premises of a facility, such as a hospital, prison, camp, office, etcetera, being serviced, a centralized location perhaps coupled to a plurality of customers being serviced, at a service bureau location, etcetera.

Figure 3:
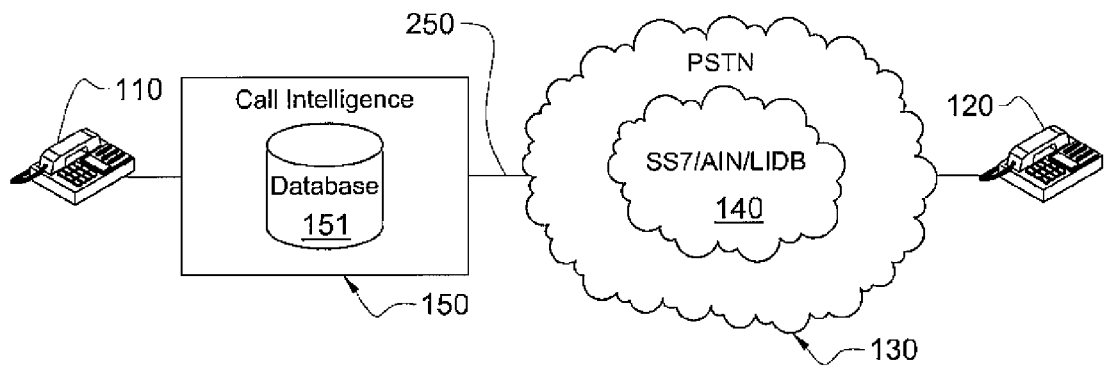
FIG. 3 shows a communication system adapted according to another alternative embodiment of the present invention.

According to embodiments of the invention, call intelligence 150 may be disposed in a link between one or more terminals and a communication network and/or signaling network. For example, the embodiment shown in FIG. 3 is disposed in a link between terminal 110 and communication network 130, shown as comprising link 250 disposed between call intelligence 150 and communication network 130. Call intelligence 150 of this embodiment may comprise a part of a call processing platform controlling access to communication network 130 by terminal 110. Call processing platforms providing control of access to a communication network to various terminals which may be adapted according to embodiments of the present invention are shown and described in the above referenced patent applications entitled "Information Management and Movement System and Method" and "Centralized Call Processing."

Figure 4:
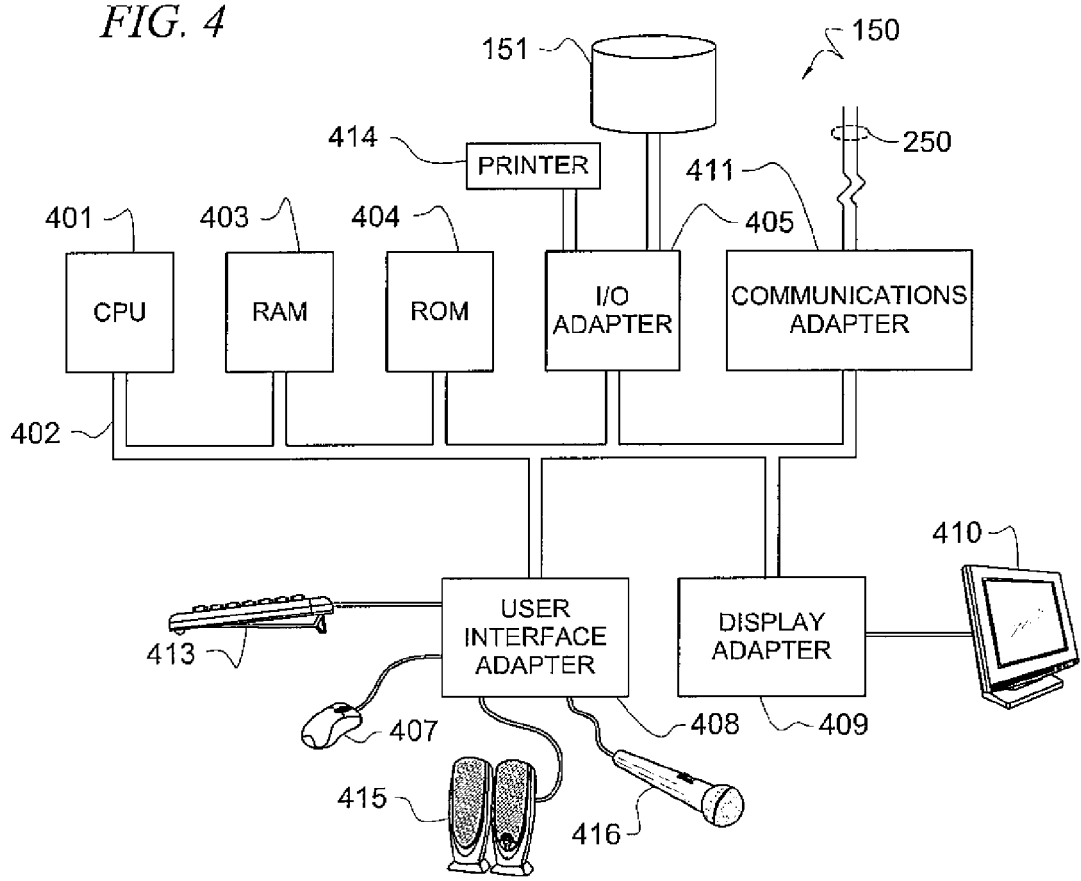
FIG. 4 shows a block diagram of a processor-based system which is adapted to implement call intelligence according to an embodiment of the present invention.

Directing attention to FIG. 4, a block diagram of an embodiment of call intelligence 150 is shown. The components of call intelligence 150 of FIG. 4 may correspond to a processor-based system coupled to communication network 130 and/or signaling network 140 as illustrated in FIGS. 2 and 3 or may correspond to a processor-based system disposed in communication network 130 and/or signaling network 140 as shown in FIG. 1 (e.g., a SCP upon which an instruction set and data defining operation as described herein is operable). Central processing unit (CPU) 401 of the illustrated embodiment of call intelligence 150 is coupled to system bus 402. CPU 401 may be any general purpose CPU or multi-CPU system. However, the present invention is not restricted by the architecture of CPU 401 as long as CPU 401 supports the inventive operations as described herein. Bus 402 of the illustrated embodiment is coupled to random access memory (RAM) 403, which may be SRAM, DRAM, SDRAM, etcetera. ROM 404, which may be PROM, EPROM, EEPROM, etcetera, is also coupled to bus 402 in the illustrated embodiment. RAM 403 and ROM 404 hold data and programs, such as an instruction set and associated data of the present invention. Logic operations (e.g., calling and/or called party verification, account validation, call redirection determinations, call treatment determinations, etcetera), interactive voice response functionality (IVR), call completion, call blocking, call interruption, and/or the like as described herein are preferably performed under control of such an instruction set and data.

Bus 402 of the illustrated embodiment is also coupled to input/output (I/O) controller 405, communications adapter 411, user interface adapter 408, and display adapter 409. I/O adapter 405 preferably connects to storage devices, e.g., one or more of a hard drive, a CD drive, a floppy disk drive, a tape drive, such as may comprise database 151 of the present invention. I/O adapter 405 of the illustrated embodiment is also connected to printer 414, which would allow the system to print or otherwise output information. Note that the printer may be a printer (e.g. dot matrix, laser, etc.), a fax machine, a copy machine, and/or the like. Communications adapter 411 is adapted to couple call intelligence 150 to a network, such as via link 250. User interface adapter 408 may be utilized to couple user input devices, such as keyboard 413, pointing device 407, and microphone 416, to call intelligence 150. User interface adapter 408 may also be utilized to provide output, such as sound output via speaker 415. Display adapter 409 may be driven by CPU 401 to control the display on display device 410. Note that the user interface could be local or could be remote, for example, via link 250. When operating remotely, user interface software and display (not shown) would typically be used.

It should be appreciated that when implemented in software, elements of the present invention may be essentially code segments to perform the necessary tasks. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etcetera.

Figure 5:
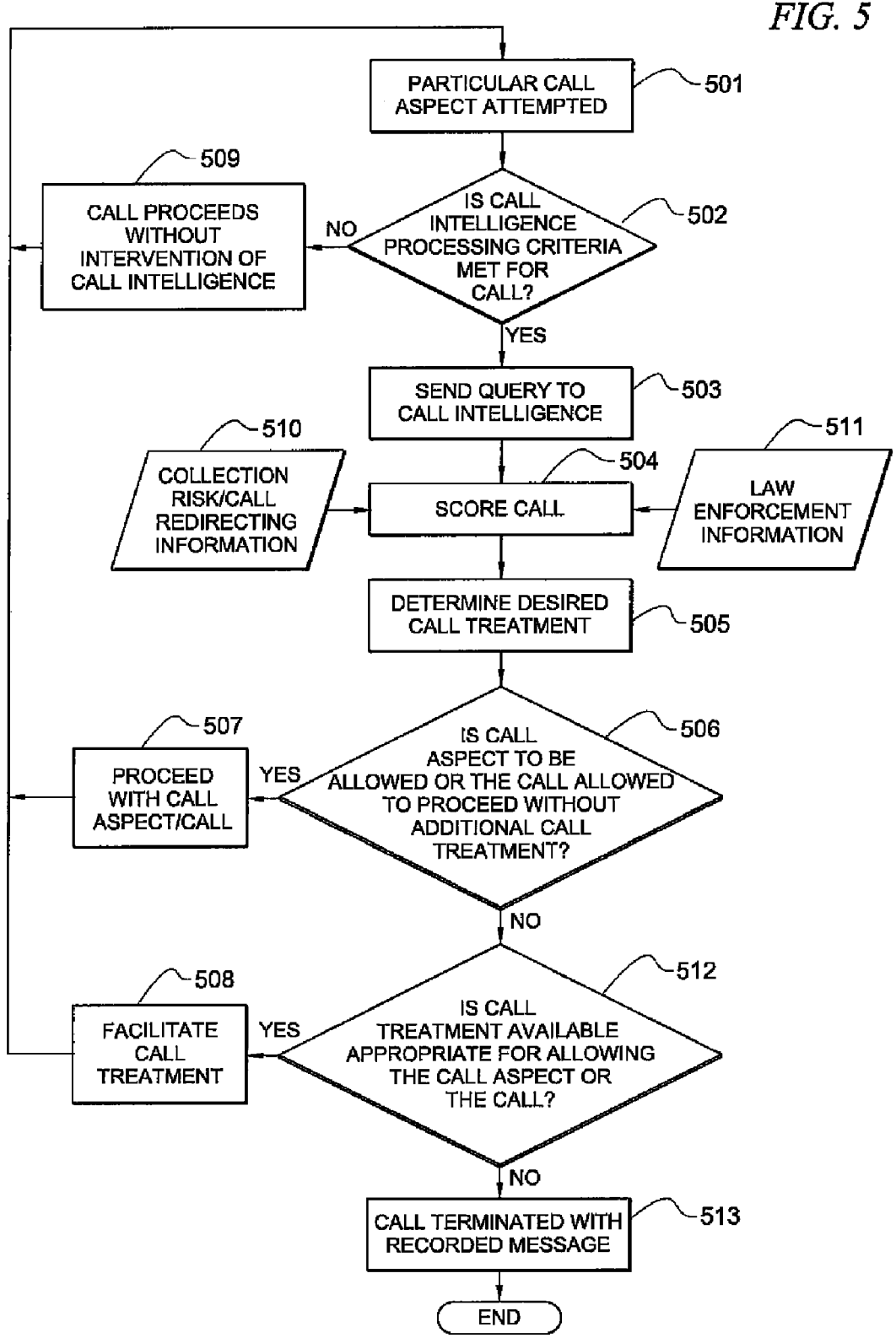
FIG. 5 shows a flow diagram of operation according to an embodiment of the present invention.

FIG. 5 illustrates preferred embodiment steps for use in call redirection detection and call treatment by call intelligence of the present invention. In performing the steps illustrated in FIG. 5, call intelligence 150 may be provided in connection with one or more networks, such as communication network 130 and signaling network 140. Call intelligence 150 may additionally or alternatively access informational databases (e.g., a LIDB in the AIN, a database maintained by the calling service provider, a database maintained by a facility from which or to which a call is being placed, and/or any other databases providing information about a caller, a called number, enhanced calling features available to or invoked by a call, etcetera).

In operation according to embodiments, a user of terminal 110 (FIGS. 1, 2, and 3) may attempt to place a call (e.g., attempting a call initialization call aspect) to a particular number, such as that associated with terminal 120 (FIGS. 1, 2, and 3). Alternatively, a particular call aspect of a call already in progress may be attempted. For example, a call may be in progress between terminals 110 and 120 and a user attempts to invoke a calling service (e.g., attempting an enhanced service initialization call aspect) such as three-way calling. Similarly, a call which is being setup between terminals 110 and 120 may be automatically redirected (e.g., attempting an enhanced service invocation call aspect) to a different terminal because a user of terminal 120 has previously invoked call forwarding. A call which is being setup between terminals 110 and 120 may initially be directed to a number other than that of terminal 120, being redirected through a remote call forwarding calling service (not shown). Particular ones of such call aspects may be detected, preferably providing call treatment control in response thereto, according to the present invention, such as to minimize unbillable or uncollectible revenue risk, to maintain security over the call, to prevent utilization of particular calling aspects with respect to certain users, locations, lines, etcetera.

Embodiments of the invention may operate to both detect implementation of such call aspects, such as to identify systems invoking enhanced calling services in real-time through communication with systems of signaling network 140, and to determine a risk that undesired call aspects (e.g., invocation of call redirecting) will be or are being implemented with respect to a particular call aspect attempted, such as to analyze call redirecting information available to call intelligence 150. Detail with respect to detecting implementation of call aspects as may be implemented according to embodiments of the present invention is provided in the above referenced patent applications entitled "System and Method for Call Treatment" and "System and Method for Call Redirect Detection and Treatment." Detail according to an embodiment of the invention with respect to determining a risk that undesired call aspects will be or are being implemented in association with an attempted call aspect is shown in FIG. 5.

In operation according to the illustrated embodiment, a particular call aspect, such as attempting to place a call or attempting to invoke a particular calling feature, is attempted at step 501. Preferably a determination is made as to whether the call meets call intelligence processing criteria for call intelligence processing according to the present invention when certain call aspects are attempted. For example, call intelligence processing may be provided with respect to calls being placed to and/or from a particular number, line, location, etcetera, calls for which a particular aspect is being attempted, calls having been identified for call intelligence processing, and/or the like. Collect calls, calls made from correctional facilities, calls made on a 1010XXX or 900 service, or other basis where risk of collection or security risk is relatively high, may be indicative that call intelligence processing of embodiments of the present invention should be implemented with respect to the call (e.g., in response to a particular call aspect being attempted). For example, call intelligence processing is implemented with respect to calls placed from a particular facility, such as a detention facility. Accordingly, at step 502 a determination is made as to whether a call intelligence processing criteria, such as may be provided by the calling number, the destination number, the service code, etcetera, suggests that call intelligence processing is to be performed with respect to the call in response to the particular call aspect being attempted.

It should be appreciated that determinations with respect to a call intelligence processing criteria being met for a call may include determinations of multiple orders. For example, it may first be determined that a call is a candidate for call intelligence processing and then the particular call aspect being attempted analyzed to determine if call intelligence processing is desired. Similarly, it may be determined that a call is a candidate for call intelligence processing and then local information, such as a previous positive or negative response from call intelligence 150 associated with the current call in some way (e.g., line, number, location, etcetera) stored at a device of signaling network 140 or in database 151, analyzed to determine if call intelligence processing is desired. For example, call intelligence 150 may access information stored in database 151, such as a previous call determinations made by call intelligence 150 as to the presence of an enhanced calling service or RCF platform at a particular called number, to determine if further call intelligence processing is desired. Such previous determinations may not only be used to indicate that call intelligence processing is desirable, but may result in a call treatment determination without further call intelligence processing based upon the previous call determination.

If, at step 502, it is determined that a call intelligence processing criteria for call intelligence processing is not met, processing according to the illustrated embodiment proceeds to step 509 wherein further processing with respect to the attempted call aspect is permitted. Proceeding with respect to the call may encompass allowing the particular call aspect attempted to be implemented and, therefore, the call to proceed. Accordingly processing may again return to step 501 to identify subsequent attempts to implement a particular call aspect with respect to that call. Additionally or alternatively proceeding with respect to the call may encompass terminating the call. For example, where the call intelligence processing criteria is determined not to have been met due to previous negative call treatment information having been provided by call intelligence 150, proceeding with the call at step 509 may provide for playing a recorded message announcing a reason for terminating the call (similar to that of step 513 discussed below) and the call may be terminated.

However, if it is determined that a call intelligence processing criteria for call intelligence processing is met, processing according to the illustrated embodiment proceeds to step 503. At step 503 one or more queries associated with the call may be made, such as to various databases (e.g., database 151) and/or systems (e.g., systems of communication network 130 and signaling network 140), to obtain information useful in determining a risk that an undesired call aspect (e.g., invocation of call redirecting) will be or is being implemented and/or determining an appropriate treatment to be implemented with respect to the call. Such queries may be made with respect to a variety of information, such as information with respect to the originator of the call (e.g., number, location, line, account, central office, etcetera), information with respect to the call destination (e.g., number, location, line, account, central office, etcetera), information with respect to the aspect of the call being attempted or implemented (e.g., call setup, three-way calling, call redirecting, etcetera), and/or like information.

Processing according to the illustrated embodiment proceeds to step 504 wherein call intelligence 150 of the illustrated embodiment scores the call for treatment according to the present invention. Call scoring provided at step 504 may simply be a positive or negative flag, indicating that the attempted call aspect, or the call itself, should be allowed or prevented. Alternatively, call scoring provided at step 504 may be a scoring metric utilized in selecting among various different call treatments.

The foregoing scoring may be based upon various criteria, such as may comprise information provided in the aforementioned query. In operation according to embodiments of the invention, information resulting from the aforementioned one or more queries is analyzed for determining a risk that an undesired call aspect will be or is being implemented with respect to a call. For example, embodiments of the present invention, at step 504, operate to "score" a call with respect to a risk that an undesired call aspect will be or is being implemented, using collection risk/call redirecting information 510, law enforcement information 511, and/or other information resulting from the aforementioned queries or otherwise available to call intelligence 150.

Embodiments of the invention operate to provide scoring, at step 504, with respect to a risk that call redirecting (i.e., an undesired call aspect) will be or is being implemented with respect to the call. For example, enhanced calling services have been misused by certain businesses and individuals in an attempt to profit by arbitraging higher rates resulting from call processing and security provided by a detention facility service provider (DFSP) necessitated by the unique situations associated with detention facility calling privileges. In order to arbitrage such higher rates, an arbitrage business might obtain, from a LEC or other competitor, a phone number in the LEC's network that is local or intralata to the prison facility. The arbitrage business may then establish a remote call forwarding (RCF) service at that phone number to forward calls to a different termination point. Accordingly, the call may appear to the DFSP to be a local call, charged at a rate lower than a long distance call, when in fact the call terminates at a location which would result in a long distance rate by the DFSP. However, because the arbitrage business is not providing the call processing and security services of the DFSP, the arbitrage business provides this long distance link at closer to open market rates than does the DFSP. Moreover, since the true termination point of the call is different from the called number, the DFSP not only loses revenue, but also loses visibility over the true destination where the telephone call is terminated and thus security may be compromised.

Accordingly, information analyzed according to embodiments of the invention include information indicative of an arbitrage business scheme having been implemented with respect to a called number. Experimentation has revealed that information such as whether the call being placed is local exchange carrier (LEC) billed, whether the call being placed is prepaid, whether the billing name and address (BNA) or similar information matches the geographic location of a location associated with the called number, whether the BNA or similar information is associated with a physical address or a mail drop (e.g., post office box), and whether the BNA or similar information is similar to that of other parties called from the facility, although perhaps not conclusive, is indicative of an arbitrage business scheme having been implemented with respect to a called number. Embodiments of the invention, therefore, operate to provide a score indicative of a level of risk that call redirecting will be or is being implemented with respect to the call using at least a portion of the foregoing information. Embodiments of the present invention preferably provide scoring based not only upon the particular information, but also based upon particular combinations of such information.

In operation according to an embodiment of the invention, the information is initially analyzed to determined whether the call is intralata and/or terminates within a local calling area. A routing table of specific area codes and prefixes (NPANXXs) and/or capability (alias) point codes relevant to served locations may be stored for use in the foregoing determination. If the call is interlata and/or terminates outside of a local calling area, it may be determined that there is a relatively low risk of remote call forwarding being implemented with respect to the call because long distance rates or similar tolls will be incurred. Accordingly, processing may proceed to step 505 for determining desired call treatment based upon a score reflective of a relatively low risk of remote call forwarding. However, further analysis with respect to the aforementioned information may be performed at step 504, such as to determine if a particular combination of the information is indicative of a higher risk of remote call forwarding.

If the call is intralata and/or within a local calling area call intelligence of the present invention further analysis of the information is preferably performed to appropriately score the call with respect to a risk of remote call forwarding. For example, information with respect to the method of payment, such as information showing that the call being placed is local exchange carrier (LEC) billed, the method of payment used in the past, the payment history, may be analyzed. Such information may be indicative of an arbitrage business scheme having been implemented with respect to a called number because such an arbitrage business is unlikely to provide prepayment for the calls of their clientele. Similarly, individuals are more likely to have paid past bills using personal checks and/or credit cards. Businesses, such as the aforementioned arbitrage business, are more likely to have a regular and predictable payment cycle. All such information may be analyzed to adjust a call score with respect to risk of remote call forwarding at step 504.

Likewise, information with respect to whether the billing name and address (BNA) or similar information matches the geographic location of a location associated with the called number may be analyzed according to embodiments of the invention. Such information may be indicative of an arbitrage business scheme having been implemented with respect to a called number because such an arbitrage business is likely to have the bill for the local service billed to the business rather than the individual clients for which remote call forwarding is being implemented. For example, the number may be associated with a direct inward dialing (DID) circuit, wherein the call forwarding platform receiving a call at the DID circuit looks up an appropriate long distance number and forwards the call to that number, such that billing for a plurality of arbitrage business clients is consolidated with respect to the arbitrage business. Even where the called number is billed directly to the arbitrage business client, there will likely be a mismatch between the geographical location associated with the called number and the BNA or similar information. Accordingly, such information may be analyzed to adjust a call score with respect to risk of remote call forwarding at step 504.

Similarly, information with respect to whether the BNA or similar information is associated with a physical address or a mail drop (e.g., post office box) may be analyzed according to embodiments of the invention. Such information may be indicative of an arbitrage business scheme having been implemented with respect to a called number because the arbitrage business and the arbitrage business client are unlikely to be disposed local with respect to the detention facility and may utilize a mail drop for billing purposes. For example, where the arbitrage business is sophisticated and presumes that having a billing address outside of a geographic location associated with the called number would cause suspicion, the arbitrage business may utilize a mail drop disposed within the geographic location. Accordingly, such information may be analyzed to adjust a call score with respect to risk of remote call forwarding at step 504.

Information with respect to whether the BNA or similar information is similar to that of other parties called from the facility may be analyzed according to embodiments of the invention. Such information may be indicative of an arbitrage business scheme having been implemented with respect to a called number because the arbitrage business is likely to establish local numbers for a plurality of clients. Even where the arbitrage business is sophisticated and chooses not to use the business name for such accounts, it is likely that a number of similar aliases will be employed, such as "John Smith," "J. Smith," "John Q. Smith," etcetera. Accordingly, such information may be analyzed to adjust a call score with respect to risk of remote call forwarding at step 504.

It should be appreciated that one piece of the information discussed above may not alone be conclusive with respect to a risk of remote call forwarding for a particular call. For example, it may be expected that various individuals with similar names may legitimately be disposed local to a detention facility and receive calls therefrom. Accordingly, information with respect to whether the BNA or similar information is similar to that of other parties called from the facility alone may not provide a high level of confidence with respect to risk of remote call forwarding. However, this information taken with other information, such as information that the called number is LEC billed, that the BNA or similar information does not match the geographic location of a location associated with the called number, and/or that the BNA or similar information is associated with a mail drop may combine to strongly suggest a risk of remote call forwarding.

Embodiments of the present invention operate to score risk of remote call forwarding as a function of particular combinations of information. For example, any one particular piece of information may provide very low confidence with respect to risk of remote call forwarding and therefore alone may affect a call score determined according to the present invention only slightly. However, various information in particular combinations may be highly indicative of risk of remote call forwarding and therefore identification of such particular combinations of information may affect a call score determined according to the present invention to a greater extent. An example of a situation where a particular combination of information may be more indicative of risk of remote call forwarding is the combination of BNA or similar information is similar to that of other parties called from the facility (alone, perhaps, not providing a high level of confidence with respect to risk of remote call forwarding) and BNA or similar information is associated with a mail drop (the combination of the two pieces of information providing a higher level of confidence with respect to risk of remote call forwarding than the sum of individual risk indicators associated with each piece of information).

Processing according to the illustrated embodiment proceeds to step 505 wherein a desired call treatment is determined. Call treatment determinations provided at step 505 may simply be a positive or negative flag, indicating that the attempted call aspect or the call itself should be allowed or prevented. Alternatively, call treatment determinations provided at step 505 may be a metric or other data utilized in implementing desired treatment of the call.

A decision metric is preferably applied by call intelligence 150 to the aforementioned call score to determine a desired or appropriate call treatment to be implemented with respect to the call. It should be appreciated that a decision metric utilized according to embodiments of the invention may comprise a threshold call scores associated with various corresponding call treatments. For example, a call score above a maximum risk threshold may result in a call treatment determination that the attempted call aspect should be prevented and/or the call terminated, thereby avoiding the risk in real-time. A call score above a lower risk threshold may result in allowing the attempted call aspect and/or the call to continue while taking other action. A call score above a still lower risk threshold may result in allowing the attempted call aspect and/or the call to continue without call intelligence 150 taking further action with respect to the call or the particular aspect of the call attempted.

Action taken where some level of risk of an undesired call aspect, such as a risk of remote call forwarding being great enough to cause concern but not great enough to warrant terminating the call, may include recording the call, placing this call and/or future calls under a heightened level of scrutiny, placing a customer service representative on the call, analyzing other call aspects with might not otherwise have been analyzed, requiring particular action by the calling and/or called parties, and/or the like. Such action may facilitate further analysis to determine the risk of undesired call aspects being implemented. For example, embodiments of the invention may operate to lower a payment verification point (PVP) of an account associated with the call, thereby forcing an arbitrage business client to call a DFSP customer care representative (or IVR system) to process future calls. Such a call (to the customer care representative or IVR system) may be used to further determine risk of remote call forwarding, such as by asking appropriate questions of the party (e.g., asking for their address, which may be different than the dialed number BNA information where an arbitrage business scheme is implemented), requiring certain actions of the party (e.g., requiring that the party call from the called number in question, which may be impossible where an arbitrage business scheme is implemented), performing certain actions by the DFSP (e.g., returning the call to the party, which may result in tell-tell sounds and/or delays in the call setup where an arbitrage business scheme is implemented), and/or the like.

Appropriate call treatment action is preferably taken in accordance with the desired call treatment determined in step 505. Accordingly, at step 506 a determination is made as to whether the call aspect or the call itself is to be allowed or implemented. Where the call treatment determination provides a metric, for example, step 506 may implement an algorithm to determine if the metric indicates the attempted call aspect should be allowed/invoked. Where the call treatment determination is a positive/negative flag, a branching decision may be made without further processing of the information.

If the call treatment determination indicates the particular attempted call aspect should be allowed without additional call treatment, processing according to the illustrated embodiment proceeds to step 507 wherein the call aspect and call are allowed/implemented. For example, if the call aspect was setting up of a call based upon a new call origination and risk of undesired call aspects being implemented are very low, call setup may be allowed to proceed to thereby place terminal 110 in communication with terminal 120 without further call treatment. Processing may again return to step 501 from step 507 to identify subsequent attempts to implement a particular call aspect with respect to that call.

If the call treatment determination indicates the particular attempted call aspect should have further call treatment provided with respect to the call, processing according to the illustrated embodiment proceeds to step 512 where a determination may be made as to whether call treatment appropriate for allowing the call aspect or the call is available. For example, where the call score indicates a relatively low risk with respect to undesired call aspects being implemented with respect to the call, appropriate call treatment may be implemented at step 508 and the call aspect and call allowed to proceed. Such call treatment according to embodiments of the invention may include recording the call, placing this call and/or future calls under a heightened level of scrutiny, placing a customer service representative on the call, analyzing other call aspects with might not otherwise have been analyzed, requiring particular action by the calling and/or called parties, and/or the like.

If the determination whether call treatment appropriate for allowing the call aspect or the call is available indicates that no such appropriate call treatment is available at step 512, processing according to the illustrated embodiment proceeds to step 513. At step 513 of the illustrated embodiment, a recorded message is played to announce that the attempted call aspect will not be implemented and/or to announce that the call will be terminated. Thereafter, attempts to implement the attempted call aspect, or perhaps the call itself, may be terminated. Of course, there is no requirement that a message be played according to the present invention.

In operation according to an embodiment of the invention, if no appropriate call treatment is available for the risk of undesired call aspects being implemented, then the calling party is blocked from making calls to the called number. An embodiment may include playing a message to the calling party that the person at the called number needs to call the service provider for a call validation inquiry. Call intelligence 150 may continue to block calls to the called number made by the calling party until a person from the called number makes a call to the service provider to determine why calls are not being connected to the called number. In another embodiment, the service provider might block the call and then call the blocked number to announce that calls are being blocked from the calling party until a call validation process occurs.

Through IVR technology, which is well known in the art, call intelligence 150 interacts with a person calling to inquire as to why calls from the calling party are not being connected to the blocked number. One purpose of this interaction is to determine if the caller is a legitimate person living at the location of the blocked number, or whether it is a person calling from the business operating the RCF platform and located remote to the location of the RCF platform at the blocked number. Thus, the interaction could involve any type of discourse necessary to determine that the caller is a legitimate party living at the location of the blocked number.

For example, the interactive process may involve call intelligence 150 querying the person as to whether they are calling from the blocked number and if they are not, instructing the person to proceed to the terminal 120 to await a return call from call intelligence 150 at the blocked number. Call intelligence 150 may optionally also ask the person making the call certain questions related to the person's identity. Then, call intelligence 150 may use the answers to the questions during the return call to verify the identity of the person answering at the called number. In this manner, call intelligence 150 could determine whether or not a representative of the RCF business, calling about the blocked number from distant location, instructs a local operative to go to location of the RCF platform, and receive the call from call intelligence 150. Typically the questions used to verify the person's identity are questions such as the person's social security number, birthday, address, mother maiden name, drivers license number, etcetera.

Call intelligence 150 then calls the blocked number. Call intelligence 150 of embodiments operate to detect any in band sounds associated with remote call forwarding, and to verify whether the person, who originally called about the blocked number, is present at the blocked number. In order to detect in band sounds associated with call forwarding, call intelligence 150 of an embodiment listens for any sounds that might be associated with call forwarding, such as a click or a series of clicks, a ring or rings and a pause, or any other sound that one would expect to hear if a call were being forwarded. If sounds associated with remote call forwarding are detected, or if the identity of the person at the blocked number is not verified, then call intelligence may continue to block the number in order to prevent any call redirecting. Alternatively, call intelligence 150 may call the blocked number and listen for in band sounds associated with call forwarding before any interaction with a caller from the blocked number occurs. Then, a determination could be made as to whether or not call blocking should continue, and whether any further interaction described above with a person from the blocked number is necessary. Also, call intelligence may store this information in database 151 for use in future call determinations made for other calls to this number, or for determinations about other numbers sharing the same or similar billing names and addresses.

It should be appreciated that call intelligence 150 may detect the presence of enhanced calling services through the use of both in band detection of sounds associated with the calling services, and out of band signaling, such as through a SS7 message, to detect that the enhanced calling features are active at the called number. In band and out of band detection may be used either in combination or independent of each other. A preferred embodiment, might use the out of band SS7 signaling to determine if enhanced calling features were active at the called number. If the query resulted in a negative response for the presence of enhanced calling features, or if the DFSP did not have a relationship with the with the service provider for the called number, and therefore was not able to get a response to the query, then call intelligence 150 would use an in band detection method. The information obtained from the queries may be used alone or in combination with other information obtained from queries by call intelligence 150 to make a determination on call treatment.

It should also be appreciated that embodiments of the present invention may operate to proceed with particular call aspects in a particular way according to the call treatment information provided by call intelligence of the present invention. For example, call treatment information of the present invention may indicate that an attempted call aspect, such as setting up a new call, should be allowed in a substantially typical fashion, but that additional call processing, such as notifying a law enforcement agency of the call, recording the call, providing call detail information to a system for call accounting, and/or the like, should be accomplished according to the present invention. Accordingly, step 507 may operate to perform call processing in addition to or in the alternative to proceeding with the particular call aspect attempted in response to call treatment information of the present invention.

Although embodiments have been described above with reference to call intelligence of the present invention being coupled to communication and signaling networks for receiving call treatment queries and providing call treatment information, it should be appreciated that other information may be exchanged therebetween according to embodiments of the present invention. For example, call intelligence of the present invention may monitor various aspects of the operation of communication network 130 and/or signaling network 140, such as to populate/update database 151. Similarly, call intelligence of the present invention may be linked to other informational databases (e.g. a LIDB in the AIN) for populating/updating information in database 151, such as on a pre-selected interval or event. Accordingly, call intelligence 150 of the preferred embodiment may collect and/or provide call detail records in real-time, thereby eliminating the need to wait for a LEC or other provider to compile and provide such records.

Moreover, it should be appreciated that call intelligence of the present invention is not limited to communication with, or providing call intelligence processing with respect to, devices of the communication and/or signaling networks. For example, facilities having premise-based call processing suffer from disadvantages associated with fraud control, validation, unbillable calls, and unavailability of real-time data and services available on the SS7/AIN networks. Accordingly, call intelligence of the present invention may be coupled to such systems, such as via a signaling gateway, to provide call intelligence with respect thereto. Additionally or alternatively, such call processors and facilities management databases may be coupled to the SS7 and/or AIN networks through a signaling gateway to provide such advantages as real-time linkage with law enforcement or multi-facility management.

Figure 6:
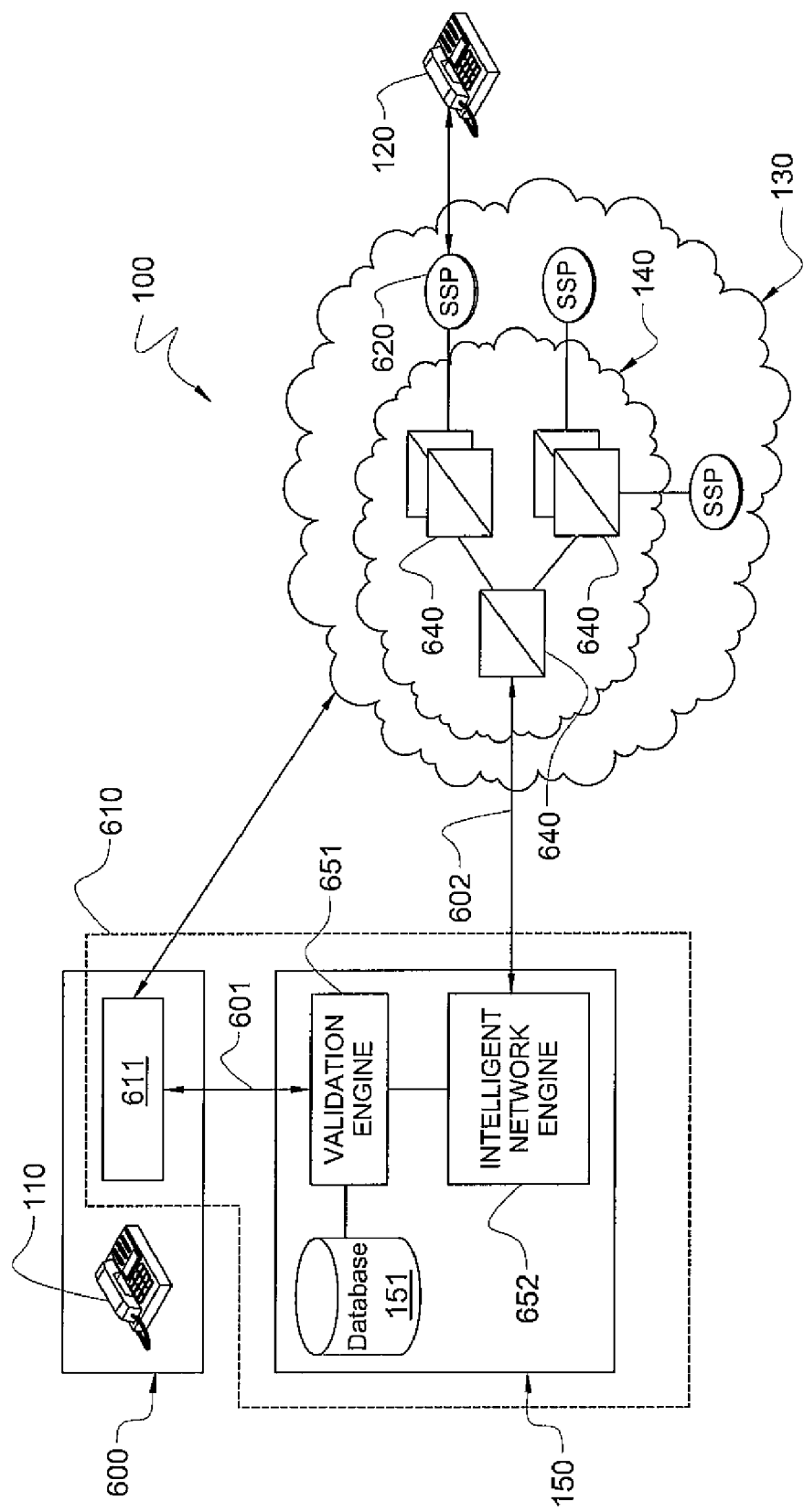
FIG. 6 shows detail with respect to an embodiment providing call control operation in response to call treatment determinations of the present invention.

Directing attention to FIG. 6, detail with respect to an embodiment providing call control operation in response to call treatment determinations of the present invention is shown. The embodiment of FIG. 6 shows calling party terminal 110 disposed at facility 600, such as may comprise an inmate facility (e.g., jail or correctional facility) or other controlled environment facility (e.g., a hospital, a camp, a hotel, a nursing home, a school, a dormitory, a business campus, and/or the like), and including call processor 610. Call processor 610, which may have components disposed within facility 600 (e.g., interface 611) and/or external thereto (e.g., call intelligence 150), preferably provides call control operation, such as user identification and/or verification, call validation, call accounting, etcetera, as is shown and described in the above referenced patent application entitled "Information Management and Movement System and Method." It should be appreciated that link 601 shown coupling interface 611 and call intelligence 150 may be provided by any suitable communication link, including network 130, network 140, a LAN, a WAN, a MAN, an intranet, the Internet, or combinations thereof.

Call intelligence 150 of the embodiment illustrated in FIG. 6 provides a plurality of functional aspects. Specifically, call intelligence 150 of FIG. 6 includes validation engine 651 and intelligent network engine 652. Validation engine 651 and/or intelligent network engine 652, or portions thereof, may be implemented as code operable upon a processor based system of call intelligence 150, such as illustrated in FIG. 3.

According to a preferred embodiment, validation engine 651 provides validation of calls initiated using call processor 610. For example, where a user of calling party terminal 110 attempts to initiate a call to a party associated with called party terminal 120, call processor 610 may provide particular call data, such as identification of the calling party, the called party number, account information, etcetera to validation engine 651 prior to establishing a communication link between calling party terminal 110 and called party terminal 120, such as to ensure that an operator of call processing system 610 will be able to collect fees for the calling service provided, to determine if the user of calling party terminal 110 is allowed to place a call to the particular called party terminal 120, to determine if called party terminal 120 is to receive calls from facility 600, etcetera.

According to a preferred embodiment, intelligent network engine 652 provides interaction with various databases and/or network elements, e.g. STPs/SCPs 640 and/or SSPs 620, as may be disposed in signaling network 140 or coupled thereto. Intelligent network engine 652 may provide queries, provide information and/or control commands, and the like, as described above. Accordingly, intelligent network engine 652 of a preferred embodiment may comprise an SS7 transport gateway coupled to the SS7 network via access or "A" links (shown in FIG. 6 as link 602) which connect a signaling end point (e.g., an SCP or SSP) of call intelligence 150 to STP 640 of signaling network 140.

It should be appreciated that the various functional aspects shown with respect to call intelligence 150 may be disposed in a number of configurations, and therefore are not limited to the particular embodiment illustrated. For example, validation engine 651, or portions thereof, may be disposed within facility 600 or at some other location remote from intelligent network engine 652, if desired.

Validation engine 651 may interact with database 151 and/or intelligent network engine 652 in determining the treatment of particular calls sought to be initiated using call processor 610. For example, call scoring derived using information obtained by intelligent network engine 652 may be utilized as described above in determining that a call should be blocked or otherwise treated.

Operation of call processor 610 according embodiments of the invention provides for detection and/or treatment of calls being redirected from one location (e.g., location associated with the called party number) or number (e.g., a remote call forwarding number) to another location (e.g., remote, perhaps forbidden, location). As used herein, call redirecting includes all types of call forwarding (e.g., call forwarding variable and preferred call forwarding (collectively call forwarding) as set forth in Telcordia specifications GR-217 LSSGR, GR-2993 ISDN, GR-580 LSSGR, GR-586 LSSGR, and GR-853 ISDN, the disclosures of which is hereby incorporated herein by reference) and remote call forwarding (e.g., basic remote call forwarding, local remote call forwarding, remote call forwarding 700 service, remote call forwarding 800 service, remote call forwarding foreign exchange overflow as set forth in Telcordia specification GR-581 LSSGR, the disclosure of which is hereby incorporated herein by reference).

It is envisioned that in many situations it may be desirable to detect and/or treat a calling party's call being redirected to a number (or location) different than that actually dialed, such as through use of the enhanced calling feature "call forwarding." For example, where facility 600 comprises a prison facility, inmates of the prison using calling party terminal 110 may be prevented from calling particular numbers, such as those associated with judges, victims, or other individuals not desiring to be contacted by prison inmates. Accordingly, call processor 610 and/or validation engine 651 may be programmed to prevent a user of calling party terminal 110 from completing a call to particular identified numbers and/or allowing a user of calling party terminal 110 to complete calls to other particular identified numbers. However, it may be possible to defeat this safeguard by an accomplice at an allowed called number invoking call redirecting to redirect calls originally directed to such an allowed number to another number. Accordingly, the use of call redirecting may present a security risk in particular situations.

Similarly, facility 600 and/or a service provider associated with call processor 610 may derive a significant source of revenue from providing calling services to users of calling party terminal 110. Such revenues may be, at least in part, toll based, such that long distance calls or calls out of or into particular areas are billed at a higher rate than other calls. A clever user might seek to avoid fully paying for the calling services rendered by call processor 610 by placing a call to a particular number, e.g., a number considered local to facility 600, which has call redirecting enabled to redirect the call to a desired location, e.g., in an area that is charged a higher toll for use of call processor 610. Accordingly, the use of call redirecting may present a business risk in particular situations.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
receiving a request to place a call to a called number;
prior to attempting to connect the call, determining whether call redirecting is likely to be implemented with respect to said call based, at least in part, upon information selected from the group consisting of:
a geographic location associated with said called number being different from a billing address for said called number;
a billing address for said called number being a mail drop; and
a billing name and address for said called number being similar to one or more billing names and addresses for other telephone numbers called from a particular facility.

2. The method of claim 1, wherein said analyzing information determines whether call redirecting is likely to be implemented with respect to said call based upon a combination of at least two of the information.

3. The method of claim 2, wherein a determination whether call redirecting is likely to be implemented with respect to said call is different based upon particular combinations of at least two of the information.

4. The method of claim 1, further comprising:
providing a risk indicator of whether call redirecting is likely to be implemented with respect to said call based upon said analyzing information.

5. The method of claim 4, wherein said risk indicator comprises a plurality of risk levels with respect to call forwarding being implemented in association with said call, said plurality of risk levels including at least three risk levels.

6. The method of claim 1, further comprising:
implementing a selected call treatment of a plurality of call treatments as a function of said analyzing information.

7. The method of claim 6, wherein said plurality of call treatments includes allowing said call to continue while invoking a call treatment action as a function of said analyzing information.

8. The method of claim 7, wherein said call treatment action comprises altering a payment verification point of an account associated with said call.

9. The method of claim 7, wherein said call treatment action comprises altering a credit limit of an account associated with said call.

10. The method of claim 7, wherein said call treatment action comprises connecting at least a portion of said call to a customer service agent.

11. The method of claim 7, wherein said call treatment action comprises requiring a party to said call to contact a customer service agent.

12. The method of claim 7, wherein said call treatment action comprises recording at least a portion of said call.

13. The method of claim 7, wherein said call treatment action comprises invoking further analysis with respect to said called number for determining whether call redirecting is being implemented with respect to said called number.

14. The method of claim 7, wherein said plurality of call treatments further includes preventing said call from continuing and allowing said call to continue without invoking a call treatment action.

15. The method of claim 1, wherein said call redirecting comprises remote call forwarding.

16. The method of claim 1, wherein said call comprises a call placed between a party disposed within a controlled environment facility and a party disposed outside of said controlled environment facility.

17. The method of claim 16, wherein said controlled environment facility comprises a detention facility.

18. The method of claim 16, wherein said call comprises a call placed from said party disposed within said controlled environment facility to said party disposed outside of said controlled environment facility.

19. The method of claim 16, further comprising:
placing said call using a controlled environment facility call processing system implementing security protocols with respect to said controlled environment facility.

20. A system comprising:
a database comprising information associated with at least one of a dialed number of a call and a party of said call; and
a call processing system in communication with said database, said call processing system coupled to a call path, wherein said call processing system is operable to obtain at least a portion of said information from said database and determine, prior to attempting to connect the call, whether call redirecting is likely to be implemented with respect to said call, wherein said call redirecting comprises call forwarding.

21. The system of claim 20, wherein said call forwarding comprises remote call forwarding.

22. The system of claim 20, wherein said at least a portion of said information is used by said call processing system to determine if said dialed number comprises a local exchange carrier billed telephone number.

23. The system of claim 20, wherein said at least a portion of said information is used by said call processing system to determine if an implied geographic location for said dialed number is different from a billing address for said dialed number.

24. The system of claim 20, wherein said at least a portion of said information is used by said call processing system to determine if a billing address for said dialed number comprises a mail drop.

25. The system of claim 20, wherein said at least a portion of said information is used by said call processing system to determine if a billing name and address for said dialed number is similar to other billing names and addresses for other telephone numbers serviced by said call processing system.

26. The system of claim 20, wherein said call processing system comprises a prison facility call processing system.

27. A method for detecting undesired calling activity, said method comprising:
identifying an attempt to initiate a call; and
analyzing information associated with said call to determine a risk level of a plurality of risk levels with respect to call forwarding being implemented in association with said call, said plurality of risk levels including at least three risk levels.

28. The method of claim 27, further comprising:
implementing a selected call treatment of a plurality of call treatments based on a level of said risk of call forwarding being implemented.

29. The method of claim 28, wherein said plurality of call treatments includes allowing said call to continue while invoking a call treatment action as a function of said analyzing information.

30. The method of claim 29, wherein said call treatment action comprises altering a payment verification point of an account associated with said call.

31. The method of claim 29, wherein said call treatment action comprises altering a credit limit of an account associated with said call.

32. The method of claim 29, wherein said call treatment action comprises connecting at least a portion of said call to a customer service agent.

33. The method of claim 29, wherein said call treatment action comprises requiring a party to said call to contact a customer service agent.

34. The method of claim 29, wherein said call treatment action comprises recording at least a portion of said call.

35. The method of claim 29, wherein said call treatment action comprises invoking further analysis with respect to said called number for determining whether call redirecting is being implemented with respect to said called number.

36. The method of claim 29, wherein said plurality of call treatments further include preventing said call from continuing and allowing said call to continue without invoking a call treatment action.

37. The method of claim 27, wherein said analyzing information analyzes information selected from the group consisting of:
- an implied geographic location for said called number being different from a billing address for said called number;
- said called number being a local exchange carrier billed telephone number;
- a billing address for said called number being a mail drop; and
- a billing name and address for said called number being similar to one or more billing names and addresses for other telephone numbers called from a particular facility.

38. The method of claim 37, wherein said analyzing information determines said risk level based upon a combination of at least two of the information.

39. The method of claim 38, wherein a determination of said risk level is different based upon particular combinations of at least two of the information.

40. The method of claim 27, wherein said call forwarding comprises remote call forwarding.

41. The method of claim 27, wherein said call comprises a call placed between a party disposed within a controlled environment facility and a party disposed outside of said controlled environment facility.

42. The method of claim 41, wherein said controlled environment facility comprises a detention facility.

* * * * *